(12) United States Patent
Lucas et al.

(10) Patent No.: US 9,212,556 B2
(45) Date of Patent: Dec. 15, 2015

(54) MULTIFUNCTION POSITIONING LOCK WASHER

(75) Inventors: James L. Lucas, Hamden, CT (US); Jason D. Himes, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 708 days.

(21) Appl. No.: 13/590,397

(22) Filed: Aug. 21, 2012

(65) Prior Publication Data
US 2014/0248136 A1    Sep. 4, 2014

(51) Int. Cl.
| | | |
|---|---|---|
| F01D 25/28 | (2006.01) |
| F01D 5/02 | (2006.01) |
| F16C 35/073 | (2006.01) |
| F16D 1/06 | (2006.01) |

(52) U.S. Cl.
CPC .............. F01D 5/026 (2013.01); F16C 35/073 (2013.01); F05D 2260/31 (2013.01); F16C 2226/70 (2013.01); F16D 1/06 (2013.01); Y10T 29/4932 (2015.01)

(58) Field of Classification Search
CPC ...... F16C 35/073; F16C 2226/70; F16D 1/06; F05D 2260/31
USPC ........... 403/355, 356, 365, 359.1, 359.6, 375; 415/119, 216.1; 416/144, 145
See application file for complete search history.

(56) References Cited

U.S. PATENT DOCUMENTS

| | | | | |
|---|---|---|---|---|
| 4,177,692 A | * | 12/1979 | Irwin | ...................... F01D 5/027 464/180 |
| 4,835,827 A | * | 6/1989 | Marra | ..................... F01D 5/027 29/407.01 |
| 6,059,486 A | * | 5/2000 | Latulipe | .................... F16B 3/00 403/355 |
| 6,453,675 B1 | | 9/2002 | Royle | |
| 8,061,969 B2 | | 11/2011 | Durocher et al. | |
| 8,091,371 B2 | | 1/2012 | Durocher et al. | |
| 8,100,666 B2 | | 1/2012 | Makuszewski | |
| 2007/0286733 A1 | | 12/2007 | Bouchard | |
| 2012/0107095 A1 | | 5/2012 | Juh | |

* cited by examiner

*Primary Examiner* — Igor Kershteyn
*Assistant Examiner* — Woody A Lee, Jr.
(74) *Attorney, Agent, or Firm* — Kinney & Lange, P.A.

(57) ABSTRACT

A gas turbine engine section comprises a rotatable shaft, first and second axially adjacent components, a nut, and a multifunction positioning lock washer. The first and second axially adjacent components are located on the rotatable shaft and are separated by an axial separation distance. The nut is configured to thread onto the rotatable shaft to hold one of the first and second axially adjacent components in compression. The multifunction positioning lock washer has antirotation geometry configured to prevent the nut from tightening or loosening. The axial length of the multifunction positioning lock washer is adjusted by removing material based on measurement of the axial separation distance to take in tolerances and reduce the axial separation distance.

19 Claims, 5 Drawing Sheets

MULTIFUNCTION POSITIONING LOCK WASHER

STATEMENT OF GOVERNMENT INTEREST

This invention was made with government support under contract number W911W6-08-2-0001 awarded by the Army Advanced Technology Directorate. The government has certain rights in the invention.

BACKGROUND

The present invention relates generally to gas turbine engines, and more particularly to radial and axial retention and spacing in gas turbine engines.

Gas turbine engines comprise at least one spool comprising a compressor and a turbine on a shared shaft. Many modern gas turbine engines comprise two, three, or more spools on concentric shafts configured to rotate at different speeds. Both compressors and turbines comprise one or more stages of alternating stationary vanes and rotating blades. The rotation of compressor blades relative to stationary vanes compresses inlet air. The resulting high-pressure gas is mixed with fuel and ignited at a combustor. The resulting high-temperature, high-pressure airflow rotates turbine rotors, which in turn drive the compressor via the shared shaft.

Gas turbine engines exist in a variety of configurations. Turbojet engines operate substantially as described above. Turboshaft engines drive rotary loads such as propeller blades via a power turbine, typically situated on a separate spool. Turbofan engines are high-bypass systems with large-diameter inlet fans on a low-pressure shaft typically shared with a low pressure compressor and a low-pressure turbine. Turbojet, turbofan, and turboshaft engines may all comprise multiple spools (e.g. a two-spool system with high and low pressure shafts, turbines, and compressors, or a three-spool system with high, intermediate, and low pressure shafts, turbines, and compressors).

Gas turbine engine components are assembled as an axial stack including both stationary and rotating components. These components are constructed with tolerances to allow for variations arising from part manufacture and assembly. Axial tolerances may be taken in by positioning adjacent axial components with spacers machined to locate rotatinghardware at an optimum location relative to static structure. Positioning spacers are commonly situated between rotating shafts and bearing assemblies of adjacent supporting stationary structures.

Axial loads in gas turbine engines are commonly secured in tension by means of threaded nuts and tie bolts or shafts that cap a portion of an axial stack. To prevent nuts from tightening or loosening, some gas turbine engines use lock washers with crenellations or other antirotating-structures. Tie shaft nuts and lock washers contribute weight, stack length, and cost to the gas turbine engine. A lightweight, highly axially compact gas turbine engine is desirable for many vehicular applications.

SUMMARY

The present invention is directed toward a gas turbine engine section comprising a rotatable shaft, first and second axially adjacent components, a nut, and a multifunction positioning lock washer. The first and second axially adjacent components are located on the rotatable shaft and are separated by an axial separation distance. The nut is configured to thread onto the rotatable shaft to hold one of the first and second axially adjacent components in compression. The multifunction positioning lock washer has antirotation geometry configured to prevent the nut from tightening or loosening. The axial length of the multifunction positioning lock washer is adjusted by removing material based on measurement of the axial separation distance to take in tolerances and reduce the axial separation distance

BRIEF DESCRIPTION OF THE DRAWINGS

FIG. 4b is a cross-sectional view of the compressor load assembly of FIG. 4a, taken through section line 4b-4b of FIG. 4a.

DETAILED DESCRIPTION

Figure 1:
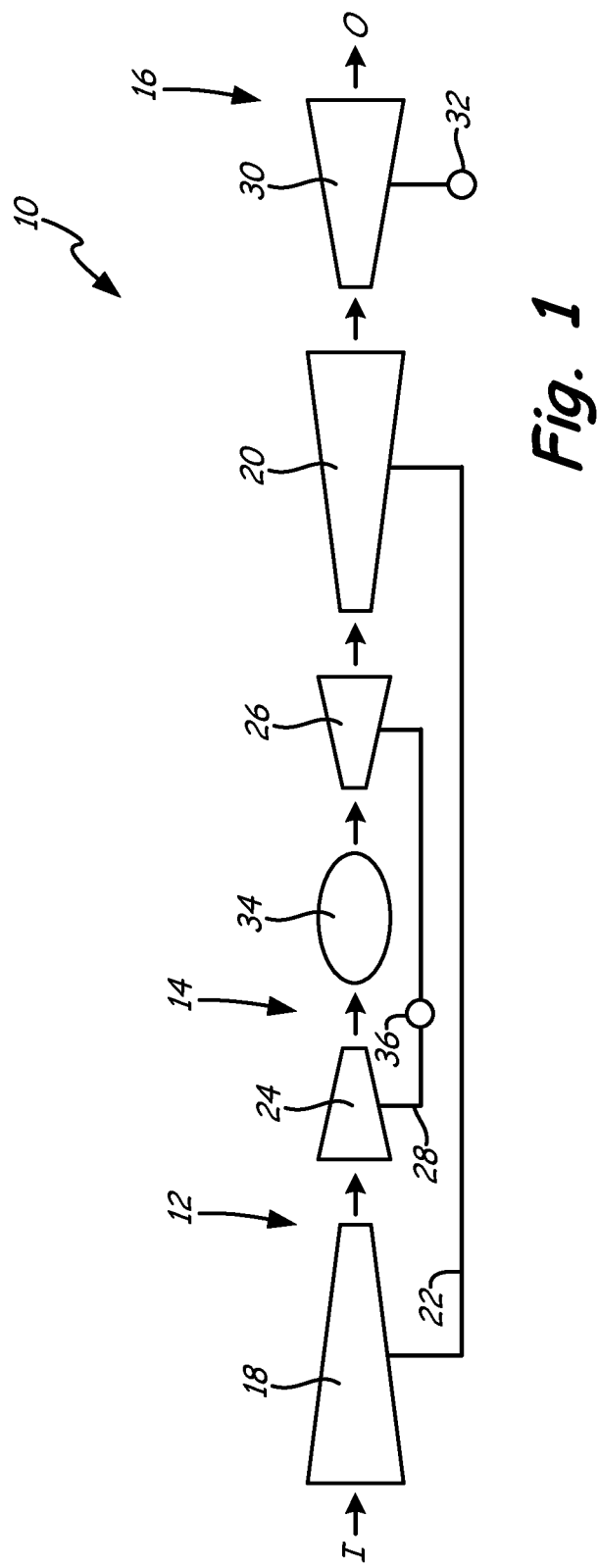
FIG. 1 is a schematic view of a gas turbine engine.

FIG. 1 is a schematic view of gas turbine engine 10, comprising low pressure spool 12, high pressure spool 14, and power spool 16. Low pressure spool 12 comprises low pressure compressor (LPC) 18 and low pressure turbine (LPT) 20 on low pressure shaft (LPS) 22. High pressure spool 14 comprises high pressure compressor (HPC) 24 and high pressure turbine (HPT) 26 on high pressure shaft (HPS) 28. Power spool 30 comprises power turbine (PT) 30 and drivetrain connection 32. Gas turbine engine 10 further comprises combustor 34 situated between HPC 24 and HPT 26, and gearbox connection 36 located on HPS 28.

FIG. 1 depicts gas turbine engine 10 as a three spool turboshaft gas turbine engine, such as for powering a helicopter or other rotary-wing vehicle. In alternative embodiments, gas turbine engine 10 may be a turbofan or turbojet engine, or any other kind of gas turbine engine. Some embodiments of gas turbine engine 10 may have more or fewer spools than depicted in FIG. 1. Gas turbine engine 10 operates by drawing gas (typically environmental air) into LPC 18 via inlet I, and compressing this gas at LPC 18 and HPC 24. In some embodiments, LPC 18 and HPC 24 axial rotary compressors each comprise at least one stage of alternating stationary vanes and rotating blades. In alternative embodiments, some portion of LPC 18 and/or HPC 24 may comprise one or more radial compressors.

Combustor 34 receives compressed gas from HPC 24, injects fuel into this compressed gas at a metered rate, and ignites the resulting fuel-gas mixture. The resulting high-pressure, high-temperature airflow drives HPT 26, LPT 20, and PT 30, each of which comprises at least one stage of alternating stationary vanes and rotating blades. HPT 26 drives HPC 24 via HPS 28, while LPT drives LPC 18 via LPS 22. In turbofan embodiments of gas turbine engine 10, LPC 20 may also drive a fan. PT 30 provides torque to drivetrain connection 32, which may for instance be a geared or direct drivetrain of a helicopter blade, a generator, or similar rotary device. LPS 22 and HPS 28 are coaxial cylindrical shafts. In some embodiments of the present invention, PT 30 may power drivetrain connection 32 via a shaft (not shown) coaxial with LPS 22 and HPS 28.

During operation of gas turbine engine, rotating components on low spool 12, including LPC 18, LPT 20, and LPS 22, rotate together at a common LPS speed. Rotating components on high spool 14, including HPC 24, HPT 26, and HPS 28, rotate together at a common HPS speed greater than the LPS speed. Rotating components of power spool 16, including PT 30 and drivetrain connection 32, rotate at yet a third speed, typically lower than the LPS speed. High spool 14 may additionally comprise gearbox connection 36 on HPS 28. Gearbox connection 36 is torque splitter configured to power an auxiliary gearbox for peripheral systems from rotation of HPT 26 and HPS 28.

As noted above, gas turbine engine 10 comprises a plurality of rotating and stationary components. These components are secured and positioned axially via nuts and spacers as described in further detail below, so as to take in tolerances to minimize the overall size and weight of gas turbine engine 10.

Figure 2:
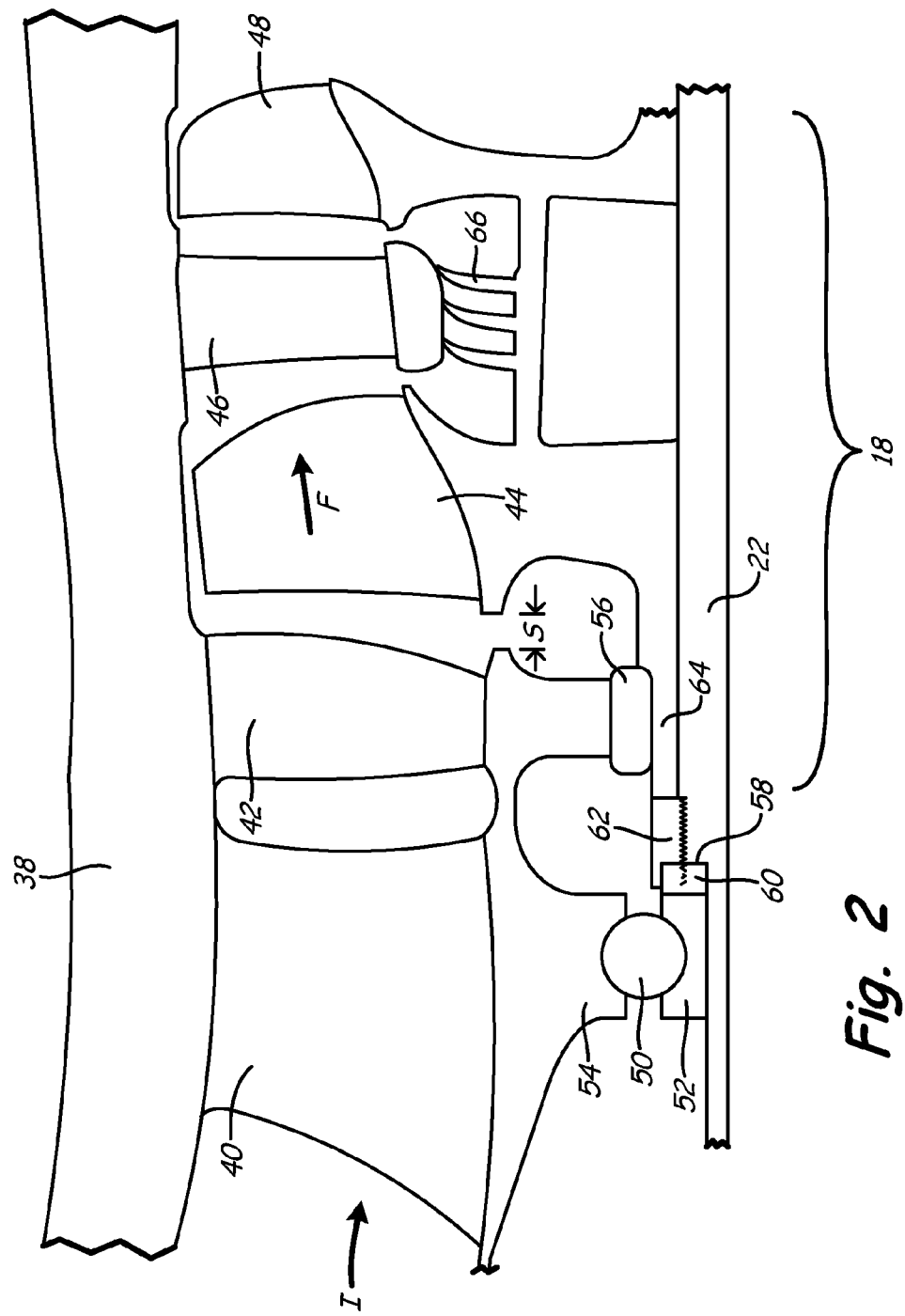
FIG. 2 is a simplified cross-sectional view of a compressor section of the gas turbine engine of FIG. 1.

FIG. 2 is a simplified cross-sectional view of a portion of LPC 18 of gas turbine engine 10 near inlet I. FIG. 2 depicts LPS 22, casing 38, inlet vanes 40, LPC stators 42 and 46, LPC rotors 44 and 48, bearings 50, inner bearing race 52, outer bearing race 54, oil seal 56, LPS shoulder 58, multifunction positioning lock washer 60, nut 62, rotor stack 64, and knife edge seals 66. LPC 18 may include additional components (e.g. further stages of vanes and blades) situated downstream of the depicted region. Although FIG. 2 depicts a region of LPC 18, the present invention may advantageously be applied to other sections of gas turbine engine 10, as well.

Casing 38 is a rigid nonrotating structure that directly retains and supports inlet vanes 40 and LPC vanes 42 and 46, and indirectly retains and supports LPS 22 and LPC rotors 44 and 48 on rotor stack 64 via bearings 50. LPS 22 is a substantially cylindrical shaft that carries rotor stack 64, including rotor disks of LPC rotors 44 and 48. Rotor stack 64 is an axial stack of rotor components including LPC rotors 44 and 48 positioned relative to shoulder 58 of LPS 22. Rotor stack 64 is axially retained by nut 62, a threaded tie or spanner nut that screws into place on a threaded portion of LPS 22 adjacent shoulder 58. Shoulder 58 is a radial step in LPS 22 that locates and axially retains multifunction positioning lock washer 60, as described in greater detail below. Bearings 50 comprise a support bearing arrangement such as a series of roller or ball bearings riding inner bearing trace 52 and outer bearing trace 54. Bearings 50 carry radial and axial load from HPS 22 to casing 38. Non-rotating structures of LPC such as LPC vanes 42 and 46 may interface with rotating components of rotor stack 64 via any of a variety of appropriate seal types to minimize undesirable gas bleed, such as oil seals 56 and knife edge seals 66.

LPC rotors 44 and 48 comprise substantially cylindrical disks with a plurality of angularly spaced-apart airfoil blades. Blades of LPC rotors 44 and 48 are separated from radially adjacent walls of casing 38 and from axially adjacent LPC stators 42 and 46 by narrow air gaps. In particular, LPC rotor 44 is separated from LPC stator 42 by an air gap separation distance S. More generally, separation distance S defines a distance between rotating and nonrotating components of LPC 18. Separation distance S may initially vary depending on assembly and machining tolerances, before tolerances are taken in by machining multifunction positioning lock washer 60 to an appropriate axial length. Multifunction positioning lock washer 60 acts as a spacer that sets the distance between shoulder 58 and inner bearing race 52, thereby determining separation distance S. Multifunction positioning lock washer 60 can be machined to an appropriate axial length by abrading or cutting away excess axial material to achieve a desired separation distance S. Multifunction positioning lock washer 60 additionally includes antirotation features as described below with respect to FIGS. 3-5, and accordingly acts as a lock washer to prevent nut 62 from rotating and thereby tightening or loosening.

Gas enters LPC 18 at inlet I through inlet vanes 40, and is compressed as it travels in flow direction F through LPC 18 by rotation of LPC rotors 44 and 48 relative to LPC stators 42 and 46. Multifunction positioning lock washer 60 can be machined to minimize separation distance S, and thereby reduce undesired gas bleed, while simultaneously antirotating nut 62 to keep rotor stack 64 in compression. Although FIG. 2 depicts a section of gas turbine engine 10 near inlet I and LPC 18, analogous embodiments of multifunction positioning lock washer 60 may be used in other locations of gas turbine engine 10, including to position and retain components of HPC 24, HPT 26, LPT 20, and PT 30.

Assembly of the depicted region of gas turbine engine 10 comprises several steps. First, rotor stack 64 is locked in place with nut 62, and bearings 50, inner bearing race 52, outer bearing race 54, and multifunction positioning lock washer 60 are installed. Separation distance S is then measured, and multifunction positioning lock washer 60 is removed and machined to achieve a desired axial length to take in tolerances of separation distance S. Newly machined multifunction positioning lock washer 60 is then replaced between LPS 22 and nut 62 to secure nut 62 against tightening or loosening rotation. Multifunction positioning lock washer 60 acts as both a lock washer and a spacer, setting separation distance S.

Figure 3:
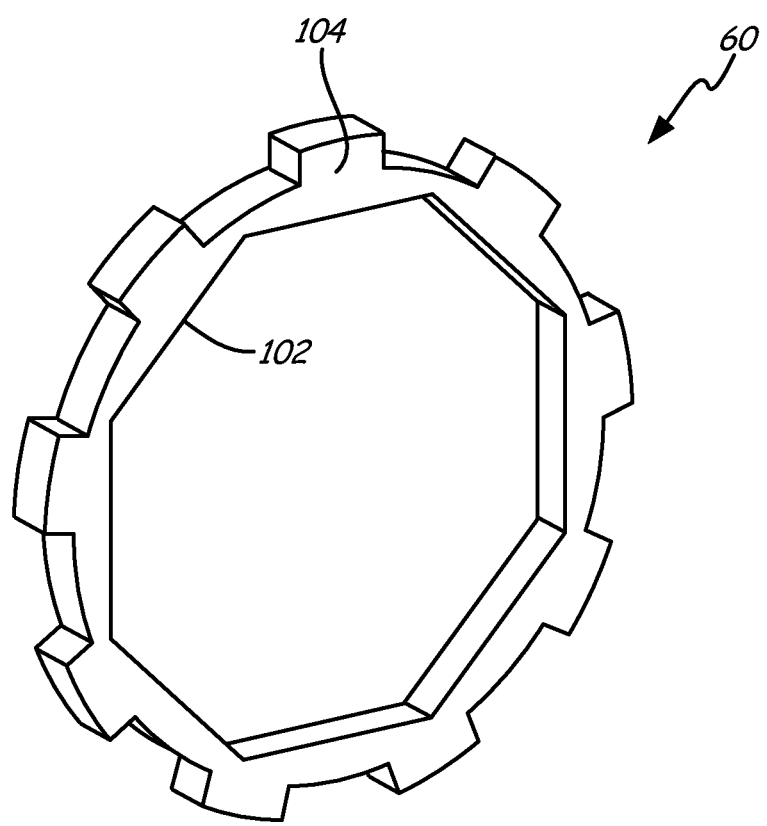
FIG. 3 is a perspective view of a multifunction positioning lock washer utilized in the compressor section of FIG. 2.

FIG. 3 is a perspective view of multifunction positioning lock washer 60. The radially inner surface of multifunction positioning lock washer 60 has washer antirotation geometry 102, while the corresponding outer surface has nut antirotation geometry 104. In the depicted embodiment, washer antirotation geometry 102 comprises a polygonal inner surface configured to interface with a polygonal surface of LPS 22 to prevent multifunction positioning lock washer 60 from rotating relative to LPS 22 (see FIGS. 4a, 4b). In alternative embodiments, washer antirotation geometry 102 may comprise slots, tabs, crenellations, or analogous antirotation features that interface with LPS 22. In the depicted embodiment, nut antirotation geometry 104 comprises a pattern of crenellations extending radially outward from the outer cylindrical surface of multifunction positioning lock washer 60 to interface with corresponding slots, grooves, or tabs in nut 62. When multifunction positioning lock washer 60 is installed on LPS 22 between LPS 22 and nut 62, nut antirotation geometry 104 prevents nut 62 from rotating relative to LPS 22, thereby preventing nut 62 from tightening or loosening. Alternative embodiments of multifunction positioning lock washer 60 may utilize different antirotation geometries 104, including slots, tabs, polygonal surfaces, or analogous antirotation features that rotationally lock nut 62 relative to multifunction positioning lock washer 60, and thereby relative to LPS 22. Multifunction positioning lock washer 60 can be machined to a desired axial length to take in tolerances contributing to separation distance S, thereby improving airflow through LPC 18 and reducing overall length of gas turbine engine 10.

Figure 4A:
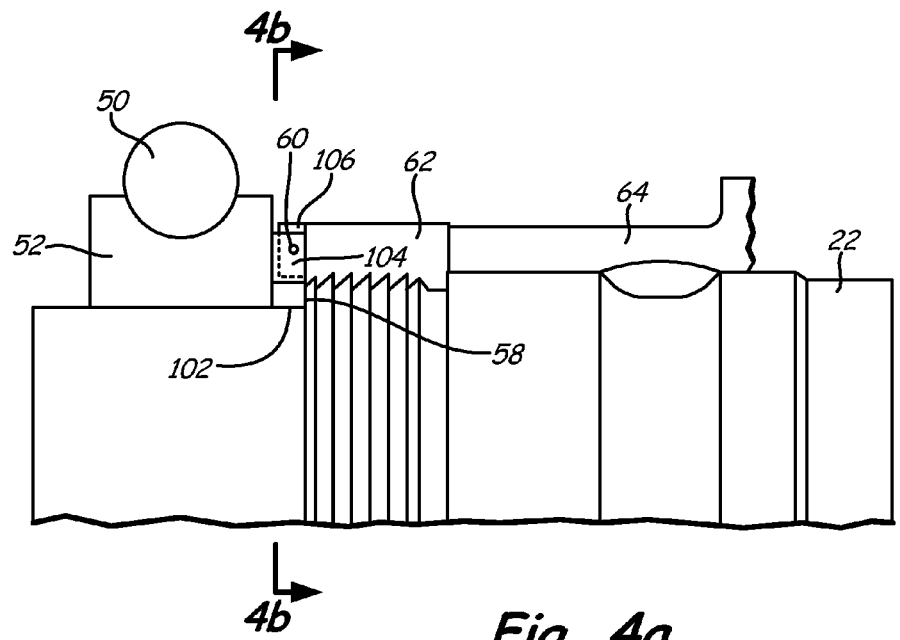
FIG. 4a is a partial cross-sectional view of a compressor load assembly of the gas turbine of FIG. 1, including the multifunction positioning lock washer of FIG. 3
Figure 4B:
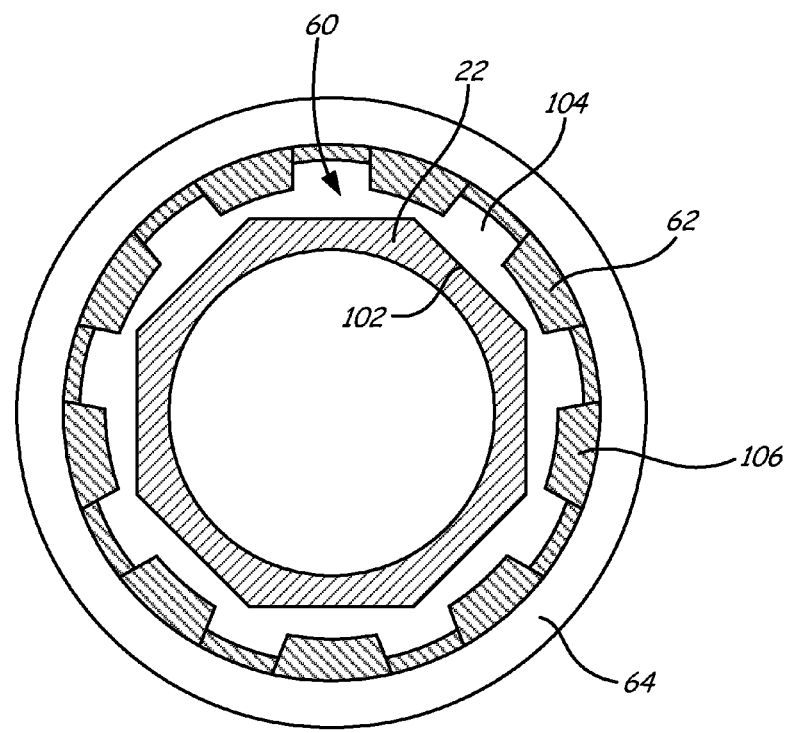

FIGS. 4a and 4b depict multifunction positioning lock washer 60 and surrounding components on LPS 22. FIG. 4a is a partial cross-sectional view showing bearings 50, inner bearing race 52, multifunction positioning lock washer 60 (with washer antirotation geometry 102 and nut antirotation geometry 104), nut 62 (with lock washer interface geometry 106), and rotor stack 64 in cross-section on LPS 22 (with shoulder 58). FIG. 4b is a cross-sectional view through section line 4b-4b of FIG. 4a, showing LPS 22, multifunction positioning lock washer 60 (with washer antirotation geometry 102 and nut antirotation geometry 104), nut 62 (with lock washer interface geometry 106), and rotor stack 64.

As shown in FIG. 4a, inner bearing race 52, multifunction positioning lock washer 60, nut 62, and rotor stack 64 all ride LPS 22. Bearings 50 provide axial and radial support for LPS 22 via inner bearing race 52, while LPS 22 carries multifunction positioning lock washer 60, nut 62, and rotor stack 64. Nut 62 screws into place on LPS 22 to hold rotor stack 64 in compression. Multifunction positioning lock washer 60 slides between nut 62 and LPS 22 to antirotate nut 62 and space inner bearing race 52 from shoulder 58. As discussed above, multifunction positioning lock washer 60 can be machined to a desired axial length to set separation distance S (see FIG. 2).

As shown in FIGS. 4a and 4b, nut 62 features lock washer interface geometry 106. Lock washer interface geometry 106 complements and interfaces with nut antirotation geometry 104 of multifunction positioning lock washer 60 to lock nut 62 against rotation when multifunction positioning lock washer 60 is installed between nut 62 and LPS 22. In the depicted embodiment, lock washer interface geometry 106 comprises a series of axially forward-extending tabs that slot between crenellations comprising nut antirotation geometry 104. In alternative embodiments, nut 62 and multifunction positioning lock washer 60 may have any complementary geometries which prevent nut 62 from rotating relative to multifunction positioning lock washer 60. In one alternative embodiment, for instance, lock washer interface geometry 106 may comprise a polygonal inner surface of nut 62 that mates with a polygonal nut antirotation geometry of multifunction positioning lock washer 60. In another alternative embodiment, lock washer interface geometry 106 may comprise a series of grooves or flanges which antirotate with corresponding tabs or flanges comprising nut antirotation geometry 104 of multifunction positioning lock washer 60. As discussed above with respect to FIG. 3, washer antirotation geometry 102 may similarly take any form appropriate to antirotate multifunction positioning lock washer 60 relative to LPS 22.

Figure 5:
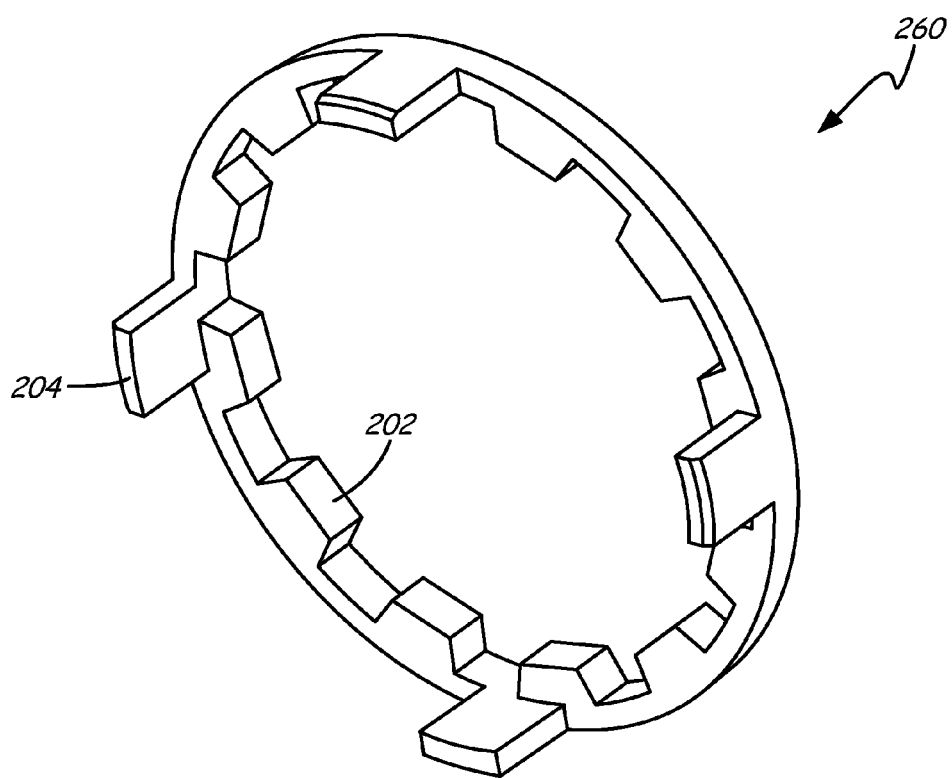
FIG. 5 is an alternative embodiment of the multifunction positioning lock washer of FIG. 3.

FIG. 5 is a perspective view of an exemplary alternative embodiment 260 of multifunction positioning lock washer 60. Alternative multifunction positioning lock washer 260 includes washer antirotation geometry 202 and nut antirotation geometry 204, which are different in form but functionally identical to washer antirotation geometry 102 and nut antirotation geometry 204. As depicted in FIG. 5, washer antirotation geometry 202 comprises a series of radially inward-extending tabs configured to lock into corresponding slots on a corresponding embodiment of LPS 22 or an analogous structure. Nut antirotation geometry 204 comprises a series of axial tabs configured to mate with radial slots and tabs of a corresponding embodiment of nut 62. Alternative multifunction positioning lock washer 260 illustrates one possible variation on multifunction positioning lock washer 60. Like multifunction positioning lock washer 60, alternative multifunction positioning lock washer 260 antirotates a nut to prevent tightening or loosening and retain a rotor stack. Also like multifunction positioning lock washer 60, alternative multifunction positioning lock washer 260 can be machined to a desired axial length to vary separation distance S (see FIG. 2). Although multifunction positioning lock washer 260 may be machined on either or both axial sides, removing material from alternative multifunction positioning lock washer 260 may in some embodiments only be feasible on a non-crenellated side.

In all of its embodiments, multifunction positioning lock washer 60 secures a stack compression nut against tightening or loosening rotation, and takes in tolerances to reduce unwanted air gaps between adjacent rotating and non-rotating components of gas turbine engine 10. Multifunction positioning lock washer 60 thus replaces separate lock washers (for nut antirotation) and spacers (for taking in tolerances in separation distance S) used in conventional systems, thereby minimizing overall axial stack distance and reducing overall part numbers, engine complexity, and cost.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine section comprising:
a rotatable shaft;
axially adjacent stationary and rotating components located on the rotatable shaft and separated by an axial separation distance;
a nut configured to thread onto the rotatable shaft to hold one of the axially adjacent stationary and rotating components in compression;
a multifunction positioning lock washer with antirotation geometry configured to prevent the nut from tightening or loosening, wherein an axial length of the multifunction positioning lock washer is adjusted by removing material based on measurement of the axial separation distance to define the axial separation distance by spacing the stationary component relative to the rotating component.

2. The gas turbine engine section of claim 1, wherein the rotating component is supported on a non-rotating structure via a bearing assembly and a rotating shaft, and wherein the multifunction positioning lock washer takes in tolerances by adjusting the position of the rotating shaft relative to the bearing assembly.

3. The gas turbine engine section of claim 2, wherein the rotatable shaft has a radial shoulder adjacent the multifunction positioning lock washer.

4. The gas turbine engine section of claim 1, wherein the rotating component comprises a rotor with airfoil blades, and wherein the stationary component comprises a stator with stationary vanes.

5. The gas turbine engine section of claim 1, wherein the antirotation geometry comprises washer antirotation geometry configured to antirotate the multifunction positioning lock washer relative to the rotatable shaft, and nut antirotation geometry configured to antirotate the nut relative to the multifunction positioning lock washer, thereby preventing the nut from tightening or loosening.

6. The gas turbine engine section of claim 5, wherein the washer antirotation geometry comprises a polygonal inner surface of the multifunction positioning lock washer configured to mate with a complementary polygonal surface of the shaft.

7. The gas turbine engine section of claim 6, wherein the washer antirotation geometry comprises a plurality of axially-extending tabs configured to mate with complementary slots on the shaft.

8. The gas turbine engine section of claim 6, wherein the nut antirotation geometry comprises a plurality of radially outward-extending crenellations or tabs configured to mate with the nut.

9. The gas turbine engine section of claim 8, wherein the nut has a plurality of lugs, slots, grooves, or tabs configured to mate with the nut antirotation geometry of the multifunction positioning lock washer.

10. A method for assembling a gas turbine engine section, the method comprising:
measuring an axial separation distance between axially adjacent components;
removing material to reduce the axial length of a multifunction positioning lock washer with antirotation geometry, so as to modify the axial separation distance;
inserting the multifunction positioning lock washer between a shaft and a nut, such that the antirotation geometry of the multifunction positioning lock washer prevents the nut from tightening or loosening, and the axial length of the multifunction positioning lock washer adjusts the separation distance.

11. The method of claim 10, wherein the axially adjacent components are adjacent rotating and stationary structures, and wherein the axial length of the multifunction positioning lock washer defines the separation distance by spacing rotating structures relative to rotating structures.

12. The method of claim 11, wherein the rotating structure is supported on a non-rotating structure via a bearing assembly and a rotating shaft, and wherein the multifunction positioning lock washer defines the separation distance between adjacent rotating and nonrotating structures by adjusting the position of the rotating shaft relative to the bearing assembly.

13. The method of claim 12, wherein the rotating shaft has a radial shoulder, and wherein inserting the multifunction positioning lock washer comprises inserting the multifunction positioning lock washer between the radial shoulder of the rotating shaft and the bearing assembly, such that the multifunction positioning lock washer abuts and is axially retained by the radial shoulder.

14. The method of claim 11, wherein the nut holds the rotating structure in compression.

15. The method of claim 10, wherein the antirotation geometry comprises washer antirotation geometry configured to antirotate the multifunction positioning lock washer relative to the shaft, and nut antirotation geometry configured to antirotate the nut relative to the multifunction positioning lock washer, thereby preventing the nut from tightening or loosening.

16. The method of claim 10, wherein the antirotation geometry comprises a polygonal surface of the multifunction positioning lock washer configured to mate with a complementary polygonal surface of the shaft or nut.

17. The method of claim 10, wherein the antirotation geometry comprises a plurality of axially-extending tabs configured to mate with complementary slots on the shaft or nut.

18. The method of claim 10 wherein the nut antirotation geometry comprises a plurality of radially outward-extending crenellations or tabs configured to mate with the shaft or nut.

19. The method of claim 10, wherein measuring the axial separation distance between axially adjacent components comprises assembling the gas turbine engine section prior to removing material from the multifunction positioning lock washer, and recording the resulting axial separation distance between axially adjacent components.

* * * * *